A. L. HARTLEY.
SPIRIT LEVEL.
APPLICATION FILED SEPT. 12, 1912.
1,098,381.
Patented June 2, 1914.
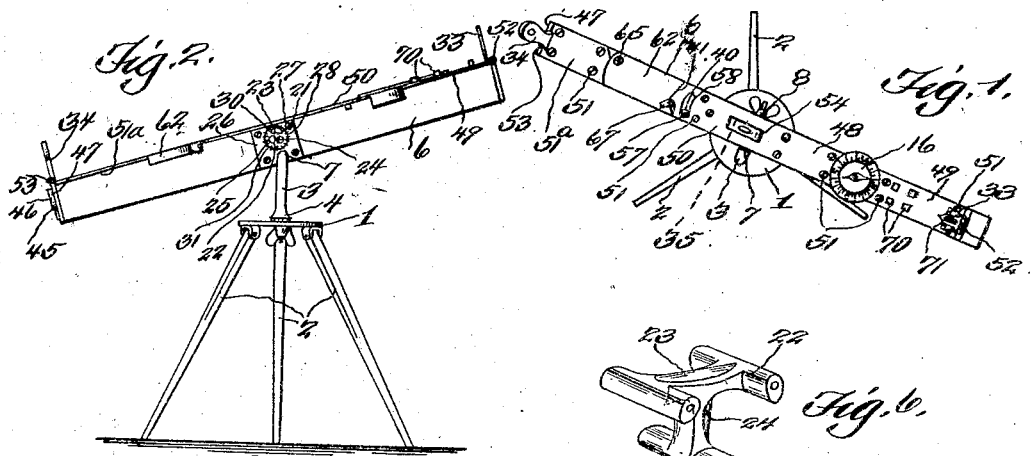
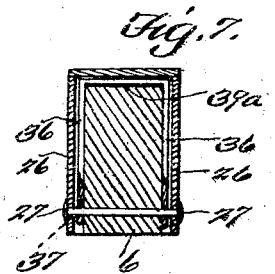
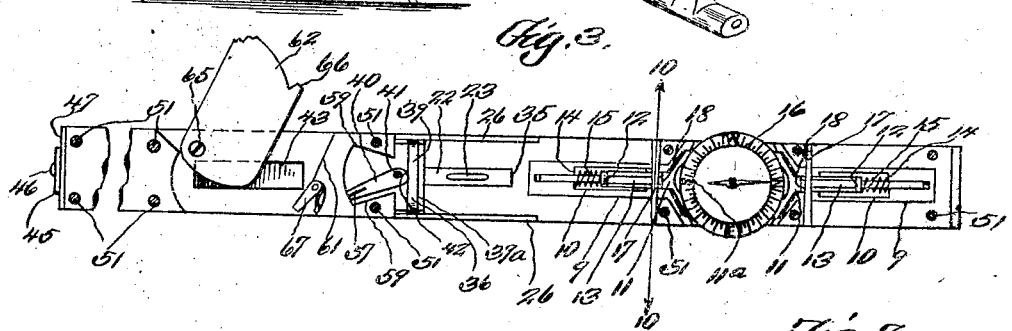
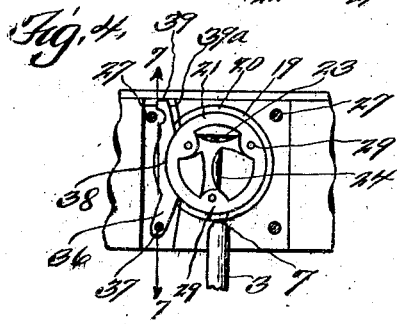
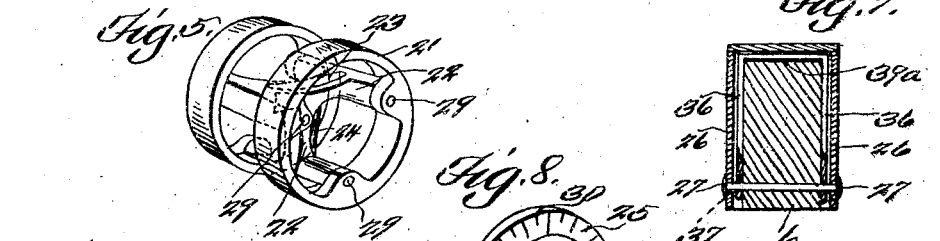
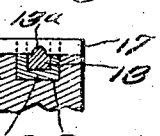
Witnesses
A. R. Wolfe
Inventor
A. L. Hartley,
By D. Swift & Co.,
his Attorneys

UNITED STATES PATENT OFFICE.

ABRAHAM LINCOLN HARTLEY, OF EUGENE, OREGON.

SPIRIT-LEVEL.

1,098,381.  Specification of Letters Patent.  Patented June 2, 1914.

Application filed September 12, 1912. Serial No. 719,970.

*To all whom it may concern:*

Be it known that I, ABRAHAM LINCOLN HARTLEY, a citizen of the United States, residing at Eugene, in the county of Lane and State of Oregon, have invented a new and useful Spirit-Level; and I do hereby declare the following to be a full, clear, and exact description of the invention, such as will enable others skilled in the art to which it appertains to make and use the same.

This invention relates to a new and useful spirit level, constructed for use in conjunction with a compass and a surveyor's transit or instrument, and adapted for use by carpenters, civil engineers, surveyors and the like.

As one of the objects of the invention, it is the aim to provide a device of this design comprising a level bar having sighting members and provided with a spirit level, with regard to which the level bar may be moved or adjusted.

A further object of the invention is to provide means for holding the level bar in adjusted position relative to the spirit level.

In practical fields the details of construction may be subjected to alterations, to which the patentee is entitled, provided the alterations fall within the scope of what is claimed.

Further objects and combinations of parts are hereinafter set forth, shown in the drawings and claimed.

In the drawings:—Figure 1 is a plan view showing the level as applied to a level bar, which is disposed at an angle of so many degrees to the north, as indicated on the compass. Fig. 2 is a view in side elevation, likewise showing a level as applied to the level bar, which is at an angle to a horizontal and perpendicular line. Fig. 3 is a plan view showing the level applied to the level bar, illustrating the top face plates of the bar removed. Fig. 4 is a fragmentary portion of the level bar in side elevation, illustrating parts 25 and 26 removed so as to illustrate the level as applied. Fig. 5 is a detail view of the spirit level holder. Fig. 6 is a detail view of the web of the holder. Fig. 7 is a sectional view on line 7—7 of Fig. 4. Fig. 8 is a detail view of one of the plates 25. Fig. 9 is a detail view of one of the plates 26. Fig. 10 is a sectional view on line 10—10 of Fig. 3.

Referring to the drawings 1 designates the top plate of a tripod having the usual legs 2, while 3 denotes an angular bracket arm having a shank 4, which penetrates the top plate 1, there being a winged nut 5 threaded to the shank for holding the bracket arm in place, whereas 6 marks the level bar, which is pivoted upon the lateral arm 7 of the bracket arm. A winged nut 8 is threaded to the lateral arm 7, to hold the level bar in place, especially when adjusted.

The level bar 6 upon its upper face is provided with a depression or dug out portions 9 of the contour shown, each end of which receives a metal casing 10. The metal casings have mounted therein jaws 11, and between the shoulders 12 of the shanks 13 of the jaws and the shoulders 14 of the casings springs 15 are interposed, thereby rendering the jaws under spring tension, in order to hold a compass 16 of the usual construction in place. Stop members 17 are provided, against which the shoulders 18 contact to limit the movement of the jaws away from each other.

The level bar 6 at substantially its central portion is provided with a transverse circular opening 19 provided with a Babbitt brass lining 20, thereby constituting a smooth bearing for the spirit level holder 21. This holder 21 is supplied with a web 22, in which two spirit levels 23 and 24 are embedded. Secured to each end of the holder is an annular plate or member 25 corresponding in construction and contour to the holder. However, these plates 25 are slightly larger in diameter than the holder, in order to overlap the Babbitt bushing or lining 20 (which is secured in the opening 19 by friction) so as to prevent displacement of the holder.

A pair of face plates 26 is secured, one upon each side of the level bar by the screws 27. The plates 26 are constructed with openings 28, in which the plates 25 move, that is, when the holder is adjusted. The plates 25 are secured to the holder by the screws 29, and are provided with annularly arranged graduations 30, representing the degrees of a circle, adapted to register with similar graduations 31 upon the plates 26, so as to ascertain the angle of an incline, relative to a horizontal line, as represented by the spirit levels, that is, when the level bar has been set at the proper angle, by sighting along the front and rear sights 33 and 34. The spirit level 23 may be read through the opening 35 of the level bar. To hold the holder 21 in adjusted positions relative to the level bar, a U-shaped brake bar shoe 36 is provided, which arches the level bar and is pivoted at 37, so that the curved portions 38 thereof will frictionally engage the holder, as shown in the drawings. The upper portion 39 of the brake bar shoe moves in the recess 39ª of the bar 6. To throw the curved portions 38 in contact with the holder a lever 40 pivoted at 41 is provided. This lever 40 is constructed with a cam portion 42, which acts against the edge of the upper portion 39 of the brake bar shoe to actuate the same, whereby the curved portions 38 will be thrown in contact with the holder. The level bar is provided with a pocket 43, for the reception of an extra compass of a different size from that of compass 16.

One end of the level bar is constructed with a chamber or hollowed out portion 44, for the reception of pencils, instruments or the like. This chamber is covered by a plate 45 pivoted at 46 to the end face plate 47. The upper portion of the level bar is supplied with a face plate 48, constructed in two sections 49 and 50, which are secured to the level bar by the screws 51. The front and rear sights are hinged at 52 and 53 to the sections 49 and 50 of the face plate 48. The section 50 of the face plate 48 is constructed with an opening 54 to register with the opening 35, whereby the spirit level 23 may be read. The lever 40 is formed with an ear 57 which moves in the opening 58 of the section 50 of the face plate 48. This ear is designed for the purpose of operating the lever 40, which is limited in its movement by the walls 59. Between the sections 50 and 51ª of the face plate 48 a space 61 is formed to receive the plate 62, which covers the pocket 43. The plate 62 is pivoted at 65, and one end of the plate is supplied with a lug 66, which is engaged by the pivoted clip 67, to hold the plate 62 over the pocket. The section 49 of the face plate 48 is provided with guide lugs 70, to receive the plate 69 which covers the compass. This section 49 is also provided with spring clips 71 to hold the sight 33 down, as shown in Fig. 4. By virtue of the compass one may ascertain how many degrees to the north a slope or incline is disposed while the slope of the same incline may be ascertained by the spirit level and the graduated plates 25 and 26 it depending on the angle at which the level bar is disposed.

The invention having been set forth, what is claimed as new and useful is:—

1. In a device as set forth, a level bar having an opening, a spirit level adjustably arranged in the opening, a U-shaped brake shoe arching the bar adapted to engage the spirit level for holding the same in adjusted positions, and a cam lever to actuate the brake shoe and to hold the same in contact with the spirit level.

2. In a device as set forth, a level bar having an opening, a spirit level holder including spirit levels adjustably arranged in the opening, annular members, one secured on each end of the holder to prevent displacement of the same from the opening and provided with graduations, plates, one secured upon each side of the bar and having openings in which the annular members are movable and provided with graduations with which the first graduations are adapted to register, a U-shaped brake shoe arching the bar and pivoted thereto adapted to engage the holder for holding the same in adjusted positions, and a cam lever to actuate the brake shoe and hold the same actuated.

3. In a device as set forth, a level bar having an opening provided with a bushing frictionally secured therein, a spirit level holder including spirit levels adjustably arranged in the opening, annular members, one secured on each end of the holder to prevent displacement of the same from the opening and provided with graduations, plates, one secured upon each side of the bar and having openings in which the annular members are movable and provided with graduations with which the first graduations are adapted to register, a U-shaped brake shoe arching the bar and pivoted thereto adapted to engage the holder for holding the same in adjusted positions, and a cam lever to actuate the brake shoe and hold the same actuated.

In testimony whereof I have signed my name to this specification in the presence of two subscribing witnesses.

ABRAHAM LINCOLN HARTLEY.

Witnesses:
F. M. ALISTER,
WM. R. ROBERTSON.